United States Patent [19]

Smetana et al.

[11] 4,390,119
[45] Jun. 28, 1983

[54] TAPE GUIDE SYSTEM

[75] Inventors: Roland Smetana; Franz Werner, both of Vienna, Austria

[73] Assignee: U.S. Philips Corporation, New York, N.Y.

[21] Appl. No.: 244,360

[22] Filed: Mar. 16, 1981

[30] Foreign Application Priority Data

Apr. 4, 1980 [AT] Austria .................... 1878/80

[51] Int. Cl.³ .................. B65H 23/04; G03B 1/48
[52] U.S. Cl. ................................ 226/196; 226/193
[58] Field of Search ................. 242/76, 197–200, 242/194, 208–210; 360/73, 74, 95, 96, 132; 226/193, 190, 196

[56] References Cited

U.S. PATENT DOCUMENTS 3,681,539  8/1972  Eibensteiner ............... 360/95
3,843,035  10/1974  Fitterer et al. ............... 226/195

FOREIGN PATENT DOCUMENTS 1438148  6/1976  United Kingdom .

OTHER PUBLICATIONS

IBM Technical Disclosure Bulletin, vol. 14, No. 3, Aug. 1971, "Capstan Surface Grooves ... Guidance", J. W. Lewis and H. Ottesen.

Primary Examiner—Leonard D. Christian
Attorney, Agent, or Firm—David R. Treacy

[57] ABSTRACT

A tape guide having a surface over which a tape is guided. The surface is formed by a coherent network of intersecting ridges whose tops form a smooth continuous surface having a regular pattern of discrete recesses in the surface.

5 Claims, 7 Drawing Figures

TAPE GUIDE SYSTEM

BACKGROUND OF THE INVENTION

The invention relates to a tape guide system for a record carrier in the form of a tape, over whose guide surfaces the record carrier is passed; and more specifically, to a tape guide arranged in a cassette for the record carrier. Such tape guides are known in a wide variety of versions. The guide surface of such a tape guide may be circular-cylindrical or conical; however, it may also be constituted by a differently curved surface. Furthermore, such tape guides may be constituted by stationary parts or by rotatable rollers.

Examples of known tape guides are described in German "Auslegeschrift" 23 25 069 to which British Pat. No. 1,438,148 corresponds, and Austrian patent specification No. 290,159 to which U.S. Pat. No. 3,681,539 corresponds. Such tape guides may be arranged in a cassette which accommodates the record carrier, or outside the cassette on a recording and/or reproducing apparatus in the path of the record carrier, as is for example described in the Austrian Pat. No. 290,159. As is known, such tape guides should comply with special requirement i.e. they should guarantee a particularly uniform movement of the record carrier over the guide surface, without the occurrence of abrupt irregularities such as those which occur when the record carrier briefly sticks to the guide surface. It is equally important that the path of the record carrier over the tape guide is not disturbed with respect to its direction, in order to ensure that the record carrier, as it leaves the tape guide, is correctly fed to the next component with which it is to cooperate guide; such a component may for example be a magnetic head, a winding hub or a tape reel, or another tape guide.

When a tape guide is arranged inside the cassette it is of special importance that these requirements are met. This is particularly true with respect to uniformity of supply and take-up of the record carrier to or from the winding hubs in the cassette, to prevent contact between the record carrier edges and the bounding walls of the cassette. Such contact often occurs if the tape rolls are irregular. In all of these cases it is the uniformity of friction between the record carrier and the guide surface of the tape guide which is of importance for satisfactory guidance of the tape.

In this respect it may be noted that tapeguides arranged outside a cassette are also known in which the friction resulting from cooperation with the record carrier is improved by a special design of the guide surfaces. This concerns tape guide drums of comparatively large diameter for use in magnetic video tape equipment. For example in accordance with German "Auslegeschrift" 19 35 534, a corrugation is formed in the guide surface of the tape guide drum; and in accordance with German "Auslegeschrift" 19 08 508 inclined grooves are formed in the guide surface. The recesses thus formed in both cases are continuous channels which extend into the area of the guide surface over which no record carrier is passed. As a result the guide-surface area which produces the friction with the record carrier is reduced; but the friction is reduced mainly because air is admitted into the laterally open channels, so that air cushions are formed underneath the record carrier. These air cushions help support the record carrier.

SUMMARY OF THE INVENTION

It is the object of the invention to construct a tape guide of these types in such a way that a most uniform record carrier motion and a most uniform record carrier path are obtained. To accomplish this object, in accordance with the invention is the guide surface is formed with a multitude of adjacent closed, or circumferentially bounded, recesses arranged in a recurrent pattern, the ridges formed between adjacent and bounding recesses constituting a coherent, or continuous, network. In such a coherent network, the ridges intersect or interconnect with each other so that their top surfaces form a continuous surface broken only by the discrete recesses. Thus it is achieved that the area which contributes to the friction between the record carrier and the surface ofthe tape-guide is substantially reduced, because the record carrier now only engages the ridges, so that lower friction and thus a more uniform record carrier motion can be obtained. Since the ridges constitute a coherent network, it is ensured that the record carrier, as it moves over the guide surface is continuously supported in a uniform manner despite the recesses. This uniform support which has a very favorable effect on the uniformity of record carrier motion.

In contrasting the inventive configuration with the groove patterns of video tape guide drums described above, it will be noted that the prior art configurations of recesses differ with respect to their shape (and at least part of the principle causing their effect) from the laterally closed recesses formed in accordance with the invention, which closed recesses are separated from each other by ridges constituting a coherent network, so that a uniform and continuous guidance or support for the record carrier is obtained, rather than a corrugated surface.

It is found to be particularly advantageous when the ridges of a tape guide in accordance with the invention form a diagonal diamond pattern. In this way a very uniform structure of the guide surface is obtained, which is found to yield a very uniform record carrier motion. In this respect it is further found to be advantageous if the diamond-shaped ridges make an angle smaller than 45° with the normal to the longitudinal direction of the tape-like record carrier. This ensures that the ridges are disposed substantially transversely of the direction of the record-carrier motion, so that the record carrier is supported by the ridges in a particularly favorable manner.

Practical tests have revealed that particularly favorable results are obtained with an embodiment in which the recesses have a depth of the order of magnitude of 10 to 50 μm, the ridges have a width of the order of magnitude of 150 to 250 μm, and the distance between adjacent ridges is of the order of magnitude of 250 to 350 μm.

With respect to the shape of the recesses there are several possibilities within the scope of the invention, allowance being made for the influence on this shape on the pattern and the shape of the ridges. In order to obtain satisfactory guidance properties it is found to be particularly advantageous, if the recesses are of parallelogram-shaped cross-section transversely of their depth direction. As a result of this, the recesses can have a comparatively large area, and at the same time a dense network of uniformly wide ridges is obtained, so that on the one hand an effective reduction of the guide surface area determining the friction with the record carrier is obtained and on the other hand the network of ridges thus formed ensures correct guidance and support for the record carrier without the occurrence of sticking effects.

The invention will now be described in more detail with reference to the drawing, which shows some embodiments of the invention to which it is not limited.

DESCRIPTION OF THE PREFERRED EMBODIMENTS

Figure 1:
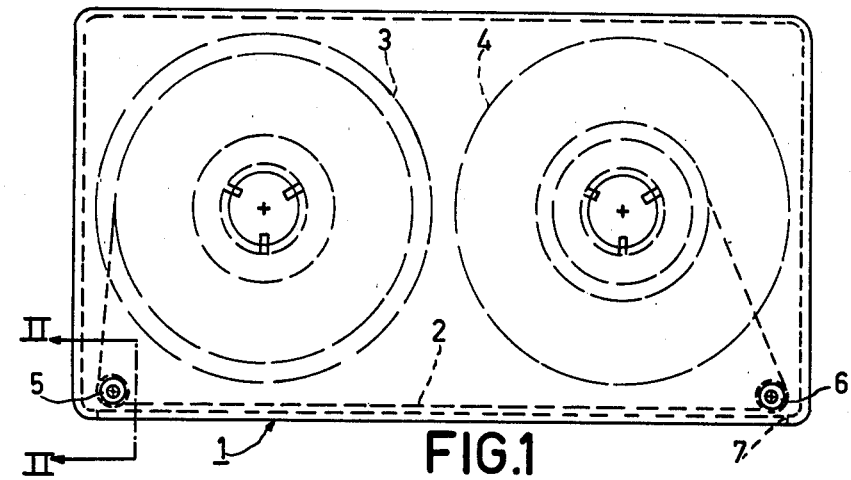
FIG. 1 is a plan view of a cassette for a tape-like record carrier, which is passed over two cylindrical tape guides inside the cassette.

In FIG. 1 a cassette 1 is shown, which accommodates a tape-like record carrier 2, for example a magnetic tape, that extends between two reels 3 and 4, one of which serves as supply reel and the other as take-up reel. The cassette 1 further comprises two circular-cylindrical tape guides 5 and 6, over which the record carrier is passed between the two reels 3 and 4, so that it extends along a narrow side of the cassette in which an opening 7 is formed. This opening 7 may for example serve to allow withdrawal of the record carrier from a cassette which is placed on a recording and/or reproducing apparatus in order to enable it to cooperate with apparatus parts, such as for example magnetic heads, drive means or further tape guides. However, it is also possible that parts on the apparatus are introduced into the cassette through such an opening 7, and are brought into contact with the record carrier.

Figure 2:
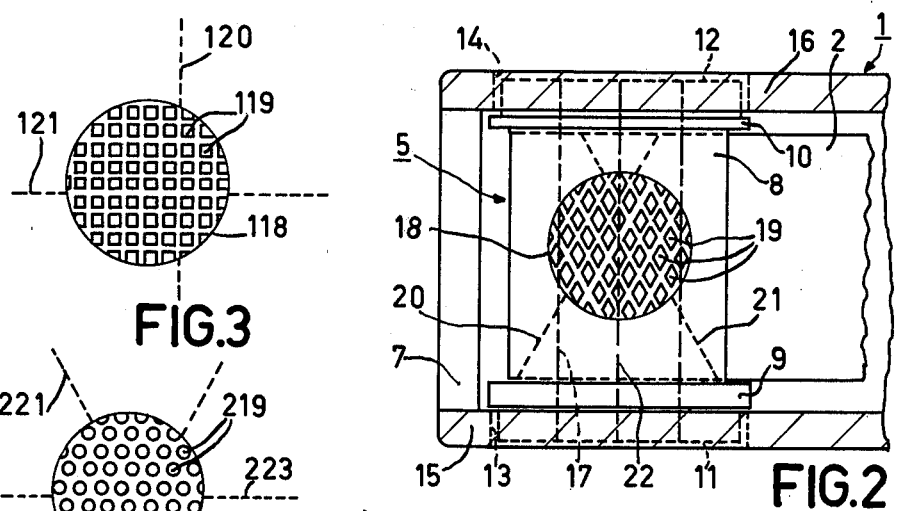
FIG. 2 is a sectional view on an enlarged scale taken on the line II—II in FIG. 1, showing parallelogram-shaped recesses in the guide surface of the tape guide.

FIG. 2 represents the tape guide 5, which is of the same construction as the tape guide 6, in more detail. It comprises a circular-cylindrical guide portion 8, whose surface constitutes the guide surface for the record carrier 2. For lateral guidance of the record carrier the guide portion 8 is provided with two flanges 9 and 10, which each adjoin a cylindrical projection 11 and 12 respectively. These projections 11 and 12 each extend into a bore 13 and 14, formed in one of the major surfaces 15 and 16 of the cassette. In this way the position of the tape guide inside the cassette is defined. The tape guide 5 may function as a rotatable roller, which moves along with the record carrier 2. However, it may also function as a stationary tape guide, in which case when the cassette is placed onto a recording and/or reproducing apparatus a pin on the apparatus engages an axial bore 17 formed in the guide portion 8, thereby preventing the tape guide from being rotated during transport of the record carrier 2.

The guide surface of the guide portion 8 of the tape guide 5 is formed with a multiplicity of adjacent closed or circumferentially bounded recesses 19 arranged in a recurrent pattern, the ridges formed between adjacent recesses constituting a coherent network. FIG. 2 schematically represents such a pattern of recesses 19 only those recesses being shown which lie within the circular area 18. The ridges formed between adjacent recesses 19 are represented schematically by dashed lines 20 and 21 outside the circle 18. In this embodiment the recesses, transversely of their depth direction, are of parallelogram-shaped cross-section, and more particularly are rhombic. By arranging the recesses in a recurrent pattern two sets of ridges are formed between adjacent recesses, which ridges form a diagonal diamond pattern and in this case are disposed at an angle of 30° relative to the normal 22 to the axial direction of the record carrier 2. Since the recesses themselves are circumferentially bounded, the ridges between them constitute a coherent network.

By providing such recesses 19 it is achieved that the area which determines the friction between the record carrier 2 and the guide surface of the tape guide 5 is substantially reduced in comparison with a smooth guide surface without recesses, while the ridges 20, 21 which constitute a coherent network ensure that the record carrier 2 is uniformly and continuously supported and guided over the entire guide surface. In this way a tape guide is obtained which guarantees a particularly uniform record carrier motion, without the occurrence of annoying sticking effects and a consequent non-uniform record carrier motion. Since the ridges 20, 21 form a diagonal diamond pattern and since they form an angle smaller than 45° with the normal 22 to the axial direction of the record carrier 2, that is, they extend substantially transversely of the axial direction of the record carrier 2, particularly favorable guiding properties of the tape guide are obtained, because the record carrier is very uniformly supported with a low friction. Of course the diagonal diamond pattern of the ridges 20, 21 may be rotated through 90° or through a smaller angle, in which case the ridges would extend substantially in the axial direction of the record carrier. In practice it is found to be advantageous if the recesses have a depth of the order of magnitude of 10 to 50 $\mu$m; the ridges have a width of the order of magnitude of 150 to 250 $\mu$m; and the distance between adjacent ridges is of the order of magnitude of 250 to 350 $\mu$m. Especially in the case of magnetic tape, these dimensions provide satisfactory guidance.

Forming such a pattern of recesses in the guide surface of a tape guide can be effected in various manners and is comparatively simple. If such a tape guide is for example made of a plastic material, which is generally effected by an injection-molding process, the recesses can be formed directly when manufacturing the tape guide. If desired, such a plastic tape guide may be provided with a metal layer by electro-deposition. If the tape guide is constituted by a metal part, the recesses in the tape guide may for example be formed by etching. It is found to be very simple if the recesses in the guide surface are formed by means of a suitably shaped embossing tool, the tape guide being rolled over the tool or the tool over the tape guide.

Figure 3:
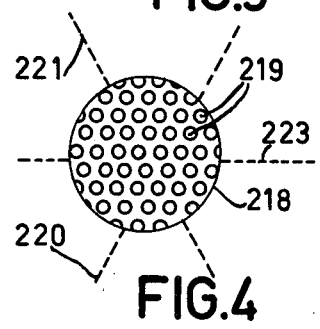
FIG. 3 is a partial, enlarged view of a pattern of recesses of rectangular shape.
Figure 4:
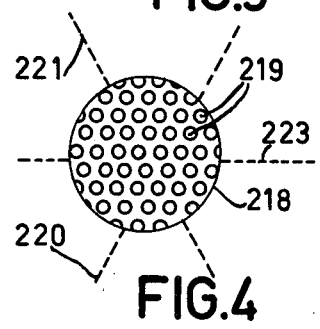
FIG. 4 is a partial, enlarged view of a pattern of recesses of circular cross-section.
Figure 5:
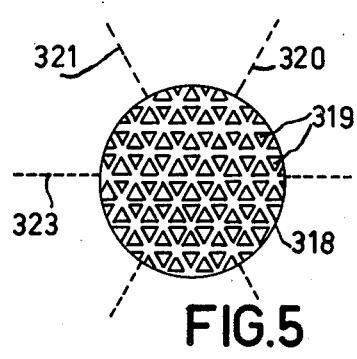
FIG. 5 is a partial, enlarged view of a pattern of recesses of triangular cross-section.

Although a rhombic shape of the recesses is found to be very advantageous, there are several other possibilities with respect to the shape of the recesses. FIGS. 3, 4 and 5 show three examples of this, the pattern of the recesses again being schematically represented in a circle. In FIG. 3 the recesses 119 are of rectangular cross-section in their depth direction, the orientation of the ridges, which constitutes a coherent network, again being represented by dashed lines 120 and 121 outside the circle 118.

In this embodiment the orientation of the ridges 120, 121 is selected so that one set of ridges 120 extends transversely of the axial direction and the other set of ridges 121 in the axial direction of the record carrier. Obviously, the orientations of the two sets of ridges may also have a specific angle, for example an angle of 45° relative to the axial direction of the record carrier. Similarly, the recesses may be of rectangular cross-section.

In the embodiment of FIG. 4 the recesses 219 are of circular cross-section transversely of their depth direction. The recesses 219 may have either the form of cylinders or the form of pits. The pattern of recesses is selected so that the ridges which constitute a coherent network extend in three directions, as is represented by the dashed lines 220, 221 and 223. Two sets of ridges, namely those designated 220 and 221, again form a diamond pattern, extending substantially transversely of the axial direction of the record carrier, while the third set of ridges, designated 223, extends in the axial direction of the record carrier. This resulst in a very good performance of the tape guide. Moreover, the pattern of recesses 219 is selected so that the ridges do not extend perfectly linearly, but essentially undulate between adjacent recesses.

The recesses 319 represented in FIG. 5 are of triangular cross-section transversely of their depth direction. Suitably, this cross-section takes the form of an isosceles triangle, and more particularly an equivalent triangle, so that the recesses 319 can again be arranged in a pattern of three sets of ridges 320, 321 and 323, which relative to each other extend at angles of 60° and 120° respectively, so that again a very good performance of the tape guide is obtained, because it supports the record carrier in a highly uniform manner.

Obviously the shape of the recesses is not limited to geometric shapes, but arbitrary cross-sections may be chosen, in which case the ridges no longer extend in accordance with a straight line, but may constitute an arbitrarily shaped coherent network. The recesses may then for example be of drop-shaped or reniform cross-section.

Figure 6:
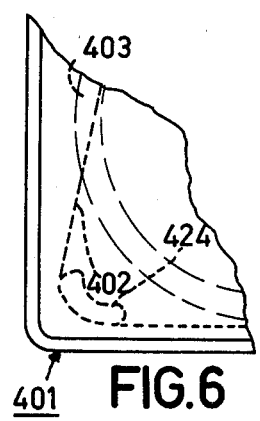
FIG. 6 is a partial plan view of a part of a cassette provided with a cylindrical tape guide of reniform cross-section.

Furthermore, it is to be noted that guide surfaces thus formed with recesses are suitable for a wide variety of tape guides. Such tape guides need not necessarily be circular-cylindrical. Other cylinders, which may be right or oblique, may have any arbitrary cross-section. Such a tape guide is represented in FIG. 6. Again it concerns a tape guide which is arranged in a cassette 401, only part of the cassette being shown. The cylindrical tape guide 424 shown is of reniform cross-section, the guide surface for the record carrier 402 being constituted by the convex surface of the tape guide. Again this guide surface may be formed with a pattern of recesses as described previously.

Figure 7:
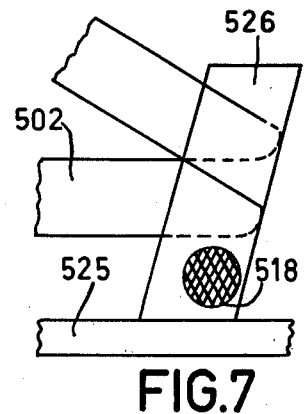
FIG. 7 is a schematic view of a tape guide which is arranged outside a cassette over which guide a record carrier is passed in a helical path.

Although it is found that the construction of guide surfaces of a tape guide in accordance with the invention is particularly suitable for tape guides arranged in a cassette, because especially for such tape guides it is important that the friction between the tape guide and the record carrier is minimized and the record carrier motion is as uniform and smooth as possible, it is also advantageous to apply the steps in accordance with the invention to tape guides which are arranged directly on a recording and/or reproducing apparatus and which serve for guiding the record carrier on said apparatus. FIG. 7 shows a corresponding embodiment. On a chassis 525 an inclined circular-cylindrical tape guide 26 is arranged, whose circumferential surface serves as guide surface for a record carrier 526 which is wrapped around the guide in a helical path. Such a tape guide may for example serve as a diverting element or as a guide drum, in the vicinity of which rotatable magnetic heads are provided for cooperation with the record carrier. A circle 518 again schematically shows that the guide surface of said tape guide is formed with a recurrent pattern of recesses which are each circumferentially bounded, between which ridges extend which constitute a coherent network.

What is claimed is:

1. A tape guide having a guide surface over which surface a tape is passed, characterized in that the guide surface comprises a coherent network of ridges, said ridges bounding a multiplicity of adjacent circumferentially bounded recesses arranged in a recurrent pattern.

2. A tape guide as claimed in claim 1, characterized in that the ridges form a diagonal diamond pattern.

3. A tape guide as claimed in claim 2, characterized in that the guide is arranged to guide a longitudinally extending tape moving in a longitudinal direction over the guide surface, and that the diagonal ridges form an angle smaller than 45° with a normal to the longitudinal direction of the tape.

4. A tape guide as claimed in claim 1, characterized in that transverse to a direction of depth of the respective recesses, each recess has a parallelogram-shaped cross-section.

5. A tape guide as claimed in claim 2, 3 or 4, characterized in that the recesses have a depth of approximately 10 to 50 $\mu$m, the ridges have a width of approximately 150 to 200 $\mu$m, and the distance between adjacent ridges is approximately 250 to 250 $\mu$m.

* * * * *